(12) United States Patent
Liverman et al.

(10) Patent No.: US 6,976,587 B2
(45) Date of Patent: Dec. 20, 2005

(54) FLEXIBLE INTERLOCKING-COLUMN PACKAGING ASSEMBLY

(75) Inventors: Ivan Neil Liverman, Middlesex, NC (US); Mark Edmund Maresh, Grand Ledge, MI (US); Jeffrey Jay Miller, Cary, NC (US); Eric Allen Stegner, Durham, NC (US); Robert William Stegner, Durham, NC (US); Christopher Michael Turner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/725,982

(22) Filed: Dec. 2, 2003

(65) Prior Publication Data

US 2005/0115864 A1    Jun. 2, 2005

(51) Int. Cl.[7] ............................................. B65D 81/02
(52) U.S. Cl. ....................... 206/586; 206/232; 206/591; 206/594; 206/722
(58) Field of Search ............................... 206/232, 320, 206/523, 585, 586, 591, 592, 594, 722, 503–505; 220/4.21, 4.24

(56) References Cited

U.S. PATENT DOCUMENTS

| | | | | |
|---|---|---|---|---|
| 1,791,367 A | * | 2/1931 | McVay et al. | 206/591 |
| 3,200,943 A | * | 8/1965 | Waterbury | 206/523 |
| 3,292,778 A | * | 12/1966 | Enderle | 206/523 |
| 4,122,946 A | * | 10/1978 | Holley | 206/523 |
| 5,715,940 A | * | 2/1998 | Son | 206/320 |
| 5,738,216 A | * | 4/1998 | Warner | 206/523 |
| 6,092,651 A | * | 7/2000 | Miller | 206/305 |
| 6,382,422 B1 | * | 5/2002 | Bocek | 206/586 |
| 6,405,873 B2 | * | 6/2002 | Koike | 206/592 |

FOREIGN PATENT DOCUMENTS

FR    2609695 A    *    7/1988    .......... B65D 81/04

* cited by examiner

Primary Examiner—Mickey Yu
Assistant Examiner—Jerrold Johnson
(74) Attorney, Agent, or Firm—J. Bruce Schelkopf

(57) ABSTRACT

A packaging assembly comprising a standard molded cushion solution that can accommodate variations in dimensions of predetermined products, including weight, while providing protection to an equipment component (or other fragile or breakable item) enclosed therein, ease in use during pre-packing and packing of an equipment component for transport, shock protection during transport, and is economically suited for its end use, is provided for. The present invention is a molded, cushion having interlocking columns which adjust the contacting areas of the cushion in relation to the product height and/or weight differences. The present invention is advantageously designed using specific geometries and interlocking columns which, contrary to traditional designs, benefit from the stressing and flexing characteristics of paper fiber.

20 Claims, 3 Drawing Sheets

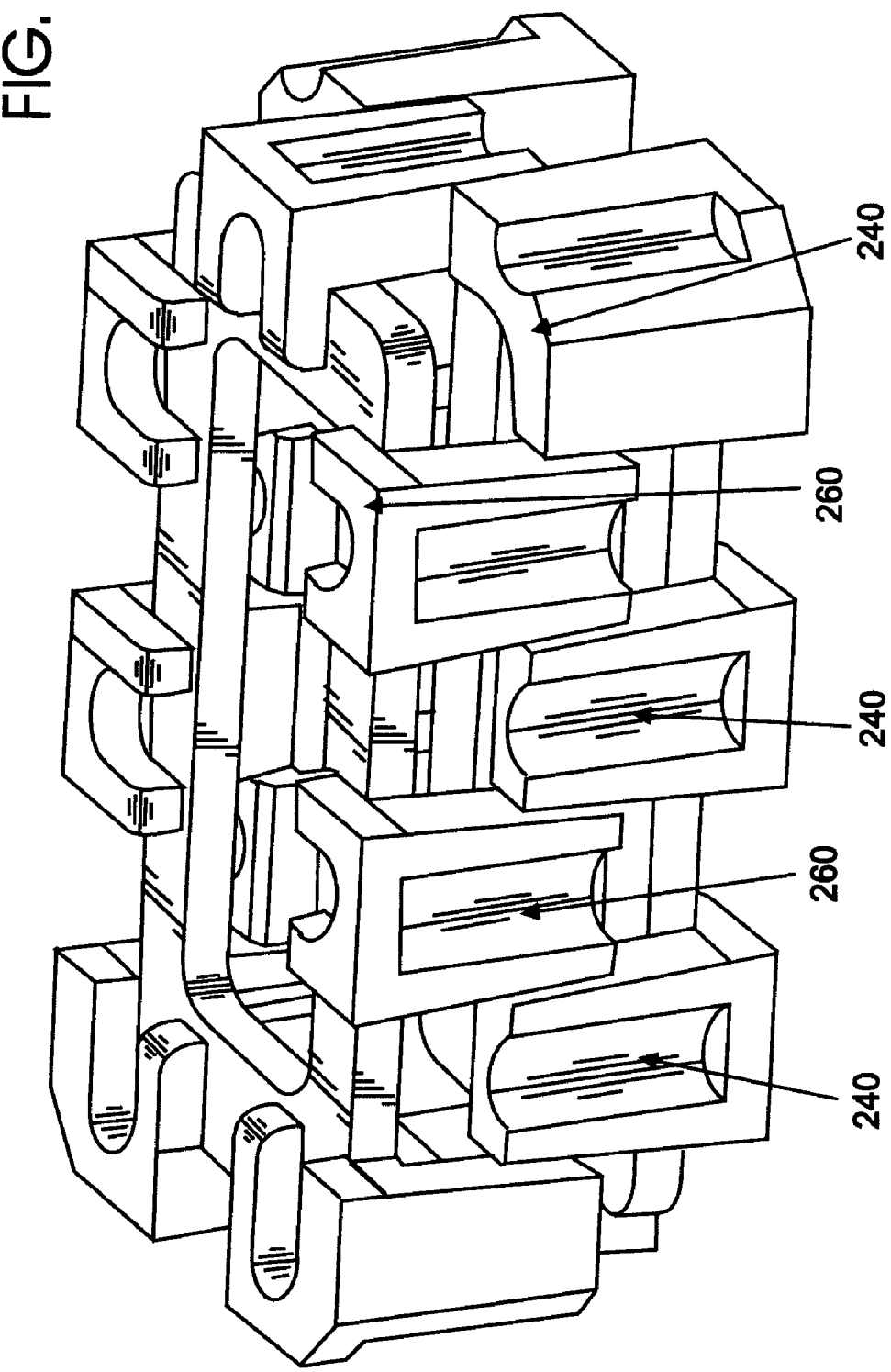

FLEXIBLE INTERLOCKING-COLUMN PACKAGING ASSEMBLY

BACKGROUND OF THE INVENTION

1. Field of the Invention

The present invention relates generally to the protective packaging systems and apparatuses therein, and more particularly to a creating a molded pulp cushion and tray packaging apparatus having a universal top and a universal bottom cushion for protectively accommodating fragile items often associated with electronic equipment, especially during post-manufacturing and transport, without the need for additional packing materials.

2. Description of Related Art

It is known that one way to protect electronic equipment (e.g., computer displays, electronic component boards, thin lead electronics, and the like) is to wrap or surround the equipment in packing foam, bubble wrap or polyurethane pellets before or concurrent with setting such equipment into a shipping container for transport. Other methods includes shipping these electronic components via parallelpiped cardboard containers, specially-molded containers or foam-injected boxing so as to minimize the movement of the equipment during transport. Unfortunately, each of these methods is only satisfactory in protecting the equipment during transport, and each have varied costs associated therewith.

It is also known to use foamed materials and even pulp-based materials in the construction of conventional packaging arrangements and assemblies. However, each has a set of known design and/or use limitations. For foam materials, though cushioning and protection are generally good characteristics, they use too much material and cannot be recycled economically. Pulp-based materials however, though abundant and relatively inexpensive, have proven to be inadequate for the routine or repeated transport of sensitive components and electrical devices. Given the negative economic and environmental aspects of non-pulp-based solutions in packaging, and the limited utility of traditional pulp-based packaging designs, it is desired that a pulp-based packaging assembly be developed.

Additionally, it is quite common in the industry, due in part to the lesser costs of using pulp-based materials, to redesign a packaging container for every unique type of product to be transported or shipped; this effort of redesigning or customizing to accommodate even variations within product lines is often time-consuming and costly in labor. The redesign effort may additionally be undertaken whenever there is a difference in the weight of a product as well. Additionally, where there is addition packaging assemblies for varied products in the same product families, there is also usually associated with those packaging assemblies, additional inventory, part numbers, material costs, tooling costs and efforts related to tracking.

SUMMARY OF THE INVENTION

Thus, a packaging assembly comprising a standard molded cushion solution that can accommodate variations in dimensions of predetermined products, including weight, while providing protection to an equipment component (or other fragile or breakable item) enclosed therein, ease in use during pre-packing and packing of an equipment component for transport, shock protection during transport, and is economically suited for its end use, is desired.

Accordingly, the present invention provides a pulp-based protective packaging assembly which overcomes these unresolved problems and deficiencies and sets forth additional advantageous attributes as further detailed by the invention in the manner described hereinbelow.

In accordance with one aspect of the present invention, the present invention is a molded, cushion having interlocking columns which adjust the contacting areas of the cushion in relation to the product height and/or weight differences. The present invention is advantageously designed using specific geometries and interlocking columns which, contrary to traditional designs, benefit from the stressing and flexing characteristics of paper fiber.

In accordance with yet another aspect of the present invention, the present invention is comprised of two cushions, which when one cushion is inverted 180 degrees, it forms a top for the first cushion containing a product or component.

In one preferred implementation of the present invention, although for the avoidance of doubt the present invention is not so limited thereto, the packaging assembly is a geometrically-shaped packaging cushion for one or more electronic products.

As used herein, the terms "Equipment Component", "Electronic Component", "product", "Fragile Component" are terms used interchangeably herein to refer to sensitive, fragile or electronic devices, assemblies, instrumentalities or materials (i.e., including but not limited to electronic circuit cards, electronic and computer devices, glass and porcelain materials, breakable items, and similar) that often must be specially wrapped or handled during shipment, transport or when moving from one point to another. Typically, though not necessarily, it is envisioned that certain of these types of electronic components and electronic devices may also be sensitive to radiofrequency (RF) interference, electric field interference (EFI), or electric, electrical, electronic, physical, and/or static shock, and similar. Similarly, the use of the term "front" or "back" to designate a side of the material sheet which is used in the present invention is not used as a limiting term but rather is used to assist in providing clarity to and understanding of the present invention.

BRIEF DESCRIPTION OF THE DRAWINGS

Other aspects, features, and advantages of the present invention will become more fully apparent from the following detailed description, the appended claims, and the accompanying drawings in which:

FIG. 3 is an elevated view of the present invention of FIG. 2 where the component is seated within the cushion assembly in accordance with a preferred embodiment.

DETAILED DESCRIPTION

Figure 1:
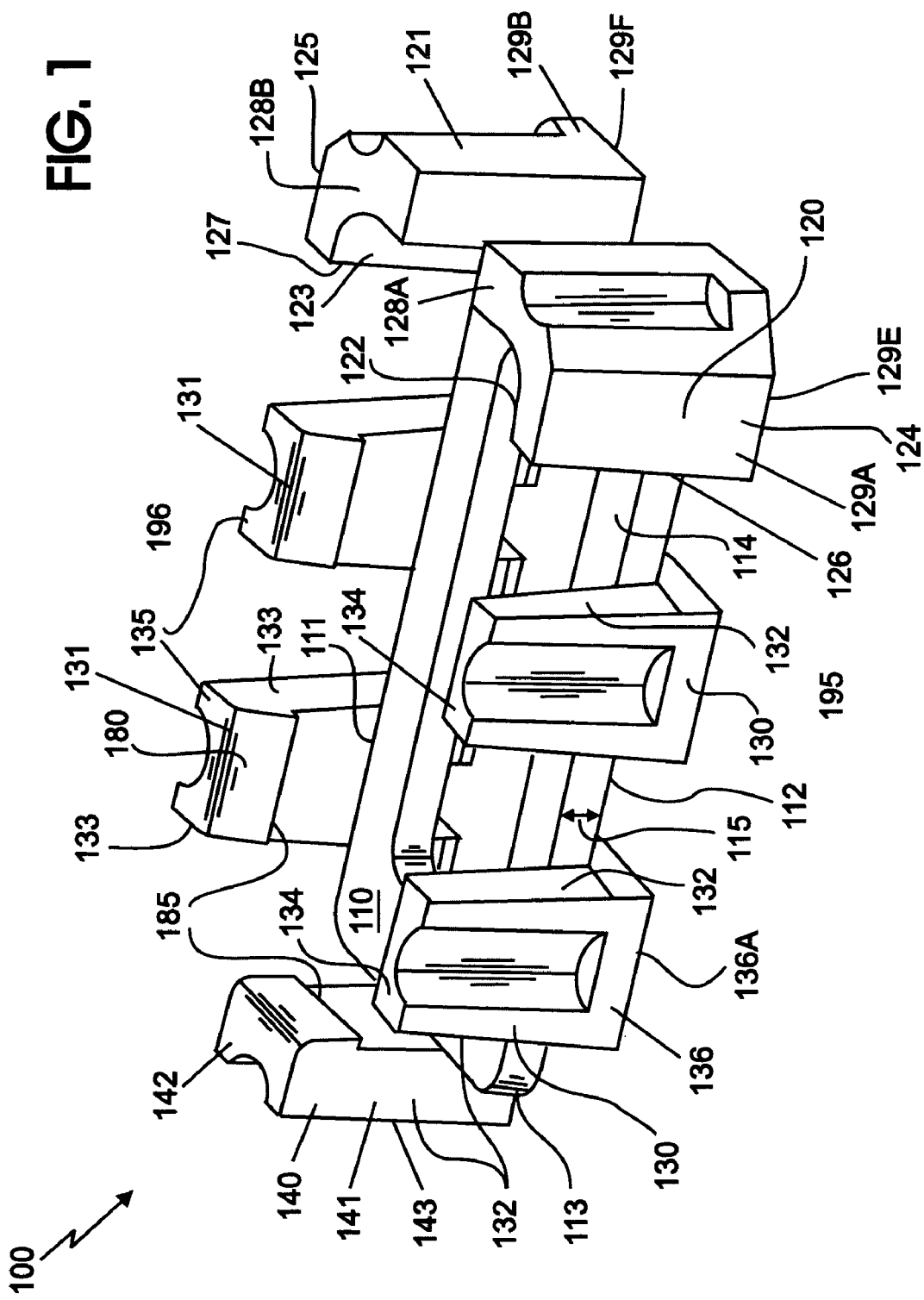
FIG. 1 is a detailed view of the present invention in accordance with a preferred embodiment.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention, but not necessarily in all. The appearances of the phrase "in one embodiment" in various places in the specification, sequentially or otherwise, does not necessarily indicate that each phrase refers to or is used in reference to the same embodiment, nor are separate or alternative embodiments mutually exclusive of other embodiments. The description herein is largely based on a particular packaging system and method based on the use of a single, unitary packaging instrument, as developed by the inventors identified above. Those skilled in the art will appreciate that the description can be equally applied to other packaging systems and methods.

FIG. 1 is a detailed view of the present invention 100 in accordance with a preferred embodiment.

The packaging assembly 100 of FIG. 1 comprises a receiving base 110 which has an upper side 111 and a lower side 112, a distal end 113 and a proximal end 114, and dimensionally has a thickness of 115. The assembly also has a plurality of corner columns 120, 121 located at the proximal end 114 of the receiving base 110.

The corner columns each have an inner wall 122,123 and an outer wall 124,125, respectively. The inner walls of the corner columns have an angular inner edge 126,127 that tapers to become more narrow in dimension as the inner wall approaches the receiving base. The corner columns also have an upper corner plateau edge 128A, 128B and a corner column base 129A, 129B having an seating side (not shown) and a floor side 129E, 129F (opposite said seating side) wherein said seating side is fixedly arranged at a predetermined location with said receiving base lower side 112.

From FIG. 1, the present invention also comprises at least a plurality of side columns 130, 131. Each side column having symmetrically angular side edges 132,133, which also taper in accordance with the inner edges of the corner columns previously described above. The side columns also each have an upper side plateau edge 134,135, and a side column base (136, not shown) having an seating side (not shown) and a floor side (136A, not shown) wherein said seating side is fixedly arranged at a predetermined location with said receiving base lower side.

From FIG. 1, the present invention further comprises a single end column 140 located at said distal end of said receiving base, having symmetrically angular end side edges 141, an upper end plateau edge 142, and an end column base 143 having an seating side and a floor side (opposite said seating side) wherein said seating side is fixedly arranged at a predetermined location with said receiving base lower side.

An aspect that is unique to the present invention is that each of the upper plateau edges of each corner column, each side column and said end column is in horizontal planar alignment, generally, with one another, such that none protrude above another, nor do any fail to rise to the same the height as the other.

Additionally, a locking edge 180 may also be present on each of the columns (excepting or alternatively including the corner columns) which is configured in relation to the component to be seated. In a preferred embodiment, the locking ridge 185 of the locking edge is located at a predetermined distance approximately equal to the width of the component to be seated. In this manner, when the component is lowered onto the receiving base, the upper edge of the component will be locked into the cushion by the locking ridge of the locking edge.

In a preferred embodiment, each of the angular side edges of each of the columns is trapezoidal in character, and the assembly has a proximal side 195 and a distal side 196.

Figure 2:
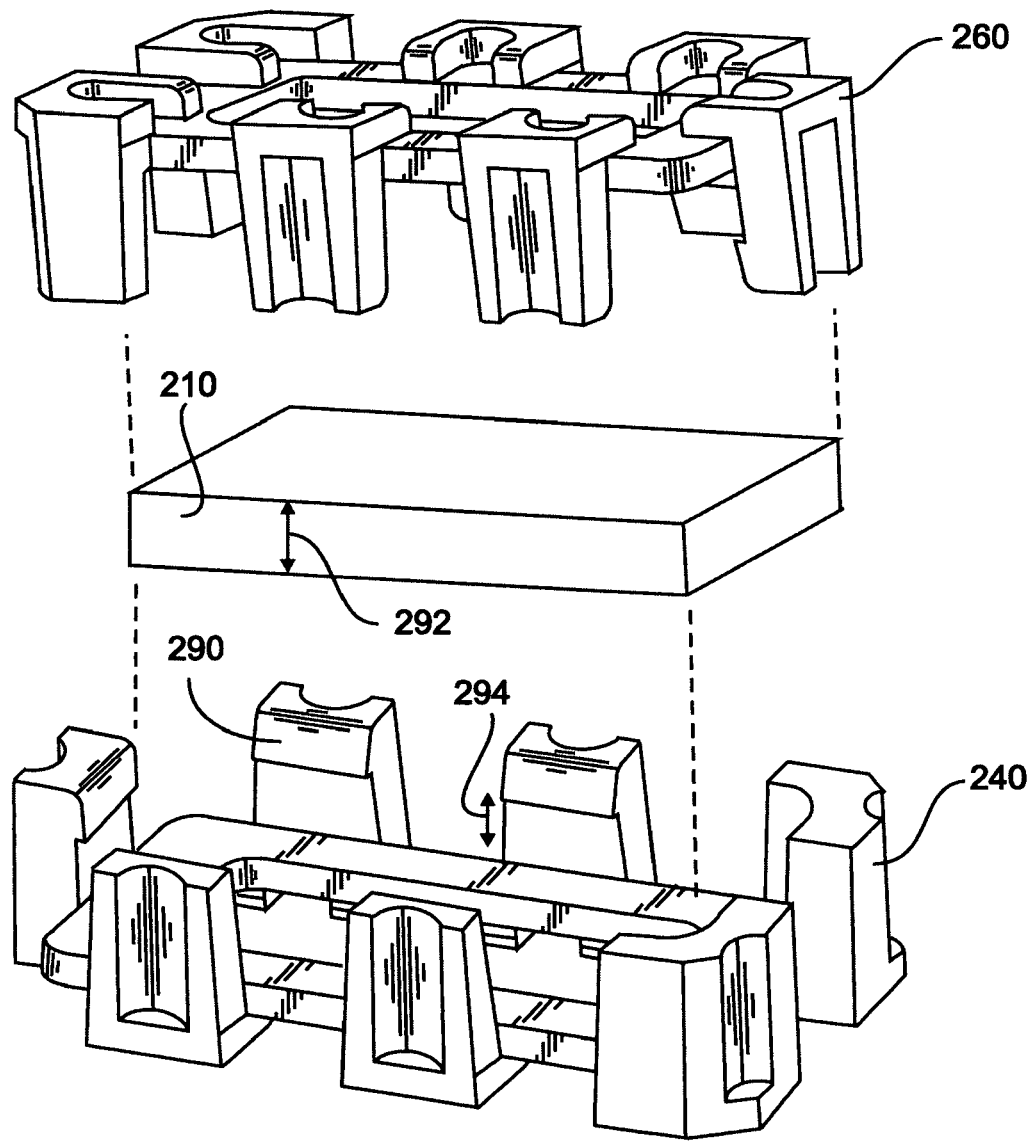
FIG. 2 is a side view of a component to be packaged, a lower cushion, and an upper cushion of the present invention in accordance with a preferred embodiment.

FIG. 2 is a side view of a component 210 to be packaged, a lower cushion 240 (such as that of 100 of FIG. 1), and an upper cushion 260 of the present invention in accordance with a preferred embodiment. For the avoidance of doubt, it is preferred that the lower cushion 240 and the upper cushion 260 each be made from the same mold or be of the same dimensions, such that one may accommodate the other.

From FIG. 2, in a preferred embodiment, each of the columns (excepting the corner columns) previously described further includes a locking edge 290 which protrudes from the column towards the component to be encompassed. The lower ridge of the locking edge is located at a distance of 294 which closely approximates the distance equal to the thickness of the component 292. In operation, a component having a thickness approximately equal to or slightly less than the distance between the lower ridge of the locking step and the upper surface of the receiving base, will securely fit within the space provided when one assembly in configured to be fitted with a second assembly as diagramed in FIGS. 2 and 3.

FIG. 3 is an elevated view of the present invention of FIG. 2 where the component (210 of FIG. 2) is seated within the cushion assembly (240, 260 of FIG. 2) in accordance with a preferred embodiment. From FIG. 3, once the component has been seated in the receiving base, the upper cushion may be lowered over the component so the columns of the upper cushion are in alignment between the columns of the lower cushion. Where the component that is seated is of approximately of a width equivalent to or less than the distance between the receiving base and the ridge of the locking edge, when the upper cushion is lowered over the component, the locking ridges of the upper cushion will lock into place on the lower side of the receiving base of the lower cushion. Concurrently, the locking ridges of the lower cushion will lock over the lower side (appears as upper side in Figure) of the receiving base of the upper cushion as well.

In the event the product is of a width equal to one-half of that the cushion was designed for, then the upper edges (plateaus) of each of the columns, when configured to encapsulate the component, will slide beyond the lower sides of the other cushion's receiving base, as the cushions fill their respective void portions caused by the reduced width component.

In the event the component is of a width greater than the distance between the receiving base and the ridge of the locking edge, when the upper cushion is lowered over the component, the locking ridges of the upper cushion will not lock into place on the lower side of the receiving base of the lower cushion. However, the columns of the upper cushion and columns of the lower cushion will interplay in configuration to form a surrounding structure that will encompass the component sufficiently to protect the component against shock and impact. In a preferred embodiment, a further securing means can be placed around the two cushions (i.e., tape, compressions, a shipping box, etc.).

Accordingly, the assembly may be provided in a kit form as well, where two cushions are supplied in concert with the component, and optionally, with an encompassing shipping container. As used herein, sealing means and securing material shall include but not be limited by materials and sealant technologies such as tape, glue, thermal activated adhesives and the like. Similarly, it is envisioned that instructions may also accompany a preform in a kit form to be instructive as to how to assemble said preform into a package assembly.

Preferably the overall length, width ad height of the assembly are determined in relation to the product or products to be packaged therein, while also accounting for the thickness and rigidity of the material to be used to create the assembly.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A packaging assembly comprising:
   a) a receiving base having an upper side and a lower side, a distal end and a proximal end,
   b) a plurality of corner columns located at said proximal end of said receiving base, each corner column having an angular corner side edge, an upper corner plateau edge, and a corner column base having a seating side and a floor side wherein said seating side is fixedly arranged at a predetermined location with said receiving base lower side,
   c) at least a plurality of side columns each side column having symmetrically angular side edges, an upper side plateau edge, and a side column base having a seating side and a floor side wherein said seating side is fixedly arranged at a predetermined location with said receiving base lower side,
   d) a single end column located at said distal end of said receiving base, having symmetrically angular end side edges, an upper end plateau edge, and an end column base having a seating side and a floor side wherein said seating side is fixedly arranged at a predetermined location with said receiving base lower side,
   wherein each upper plateau edge of each corner column, each side column and said end column is in horizontal planar alignment with one another.

2. The assembly of claim 1, wherein said assembly is primarily pulp-based in composition.

3. The assembly of claim 1, wherein said assembly is primarily comprised of a semi-rigid material composition.

4. The assembly of claim 1, wherein said angular corner side edge, angular side edge, and angular end side edge of each of their respective columns, is trapezoidal in shape.

5. The assembly of claim 4, wherein there are two side columns on a proximal side and two side columns on a distal side.

6. The assembly of claim 5, wherein said two side columns on said proximal side are spaced from one another at a distance equal to the distance between the two side columns on said distal side.

7. The assembly of claim 6, wherein each of said side columns and said end column further comprise a locking edge.

8. The assembly of claim 7, wherein said locking edge further comprises a locking ridge.

9. The assembly of claim 8, wherein the distance between the locking ridge and the upper side of the receiving base is approximately equal to or slightly greater than a predetermined value.

10. The assembly of claim 9, wherein said predetermined value is equal to a distance of approximately a width of a component to be secured by the assembly.

11. The assembly of claim 9, wherein said predetermined value is equal to a distance of approximately one-half of a width of a component to be secured by the assembly.

12. The assembly of claim 9, wherein said predetermined value is equal to a distance of approximately twice a width of a component to be secured by the assembly.

13. A unitary packaging assembly kit comprising
    at least two packaging assemblies, each assembly comprising
      a) a receiving base having an upper side and a lower side, a distal end and a proximal end,
      b) a plurality of corner columns located at said proximal end of said receiving base, each corner column having an angular corner side edge, an upper corner plateau edge, and a corner column base having a seating side and a floor side wherein said seating side is fixedly arranged at a predetermined location with said receiving base lower side,
      c) at least a plurality of side columns each side column having symmetrically angular side edges, an upper side plateau edge, and a side column base having a seating side and a floor side wherein said seating side is fixedly arranged at a predetermined location with said receiving base lower side,
      d) a single end column located at said distal end of said receiving base, having symmetrically angular end side edges, an upper end plateau edge, and an end column base having a seating side and a floor side wherein said seating side is fixedly arranged at a predetermined location with said receiving base lower side,
      wherein each upper plateau edge of each corner column, each side column and said end column is in horizontal planar alignment with one another,
    and,
    a component.

14. The kit of claim 13, further comprising instructions.

15. The kit of claim 13, wherein said assembly is primarily pulp based in composition and said pulp-based composition is primarily newsprint.

16. The kit of claim 13, wherein each of said side columns and each of said end column further comprise a locking edge.

17. The kit of claim 13, wherein said locking edge further comprises a locking ridge.

18. The kit of claim 13, wherein the distance between the locking ridge and the upper side of the receiving base is approximately equal to or slightly greater than a width of said component.

19. The kit of claim 13, wherein the distance between the locking ridge and the upper side of the receiving base is approximately equal to or slightly greater than one-half of a width of said component.

20. The kit of claim 13, wherein the distance between the locking ridge and the upper side of the receiving base is approximately equal to or slightly greater than twice a width of said component.

* * * * *